Nov. 22, 1966    R. M. COLE    3,286,437
APPARATUS FOR APPLYING COVERS TO CUPS
Filed April 10, 1963    2 Sheets-Sheet 1

INVENTOR.
RICHARD MELVIN COLE
BY Oldham & Oldham
ATTYS.

Nov. 22, 1966    R. M. COLE    3,286,437
APPARATUS FOR APPLYING COVERS TO CUPS
Filed April 10, 1963    2 Sheets-Sheet 2
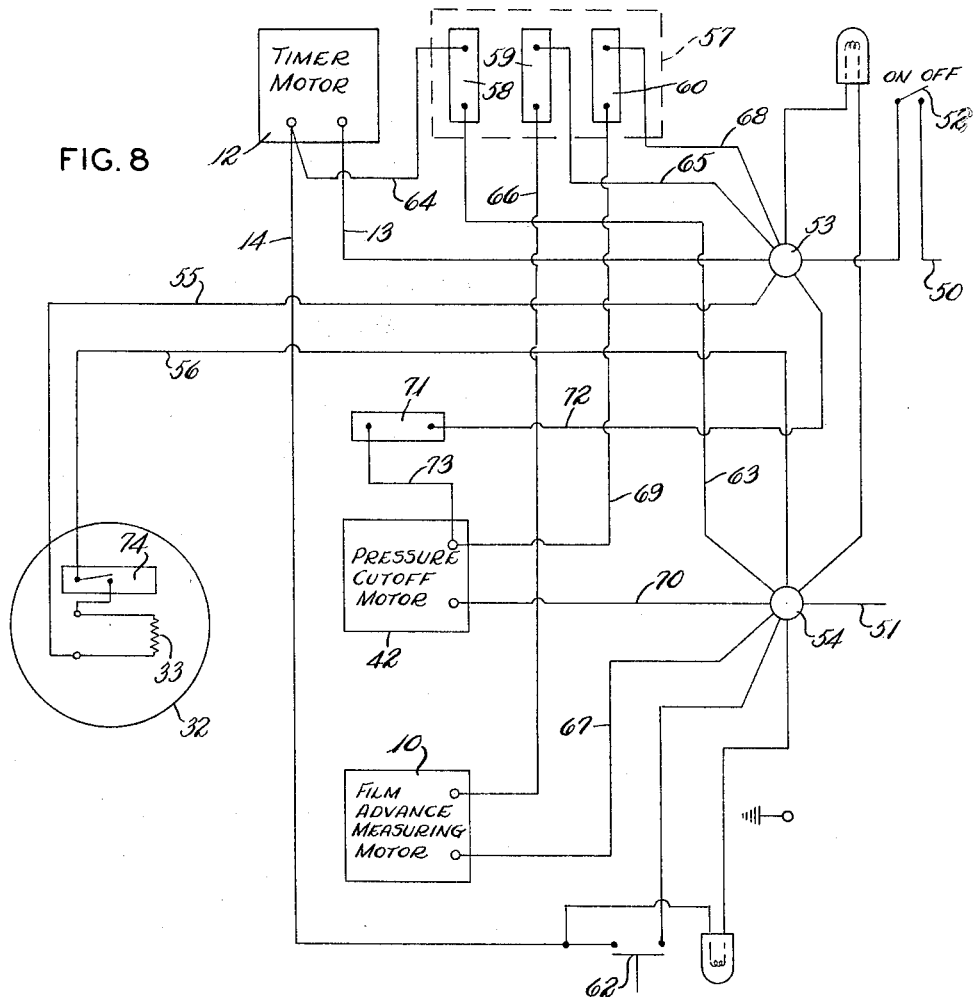
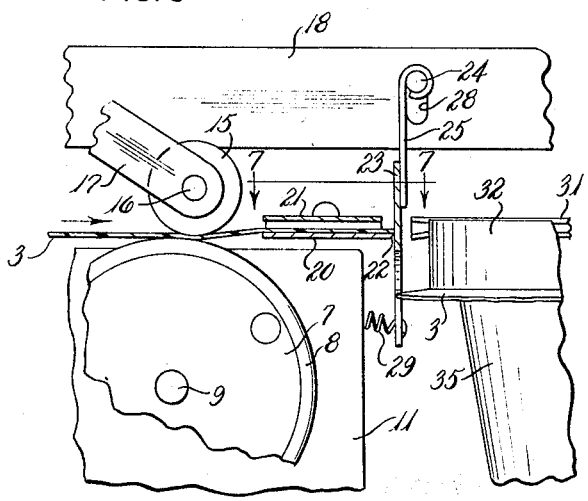
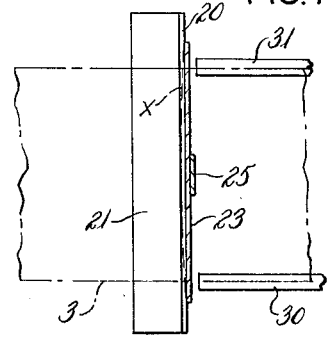
INVENTOR.
RICHARD MELVIN COLE
BY Oldham & Oldham
ATTYS.

United States Patent Office 3,286,437
Patented Nov. 22, 1966

3,286,437
APPARATUS FOR APPLYING COVERS TO CUPS
Richard Melvin Cole, 3353 Hudson Drive,
Cuyahoga Falls, Ohio
Filed Apr. 10, 1963, Ser. No. 272,156
11 Claims. (Cl. 53—296)

The present invention relates to an apparatus for and method of applying thermoplastic film covers to thermoplastic cups, or other containers.

It is known that in many instances it is highly desirable to seal the contents of a container temporarily within the container. Thus, when one is going to carry either hot or cold liquids from a supply source to a remote point for consumption, it is very difficult to avoid spilling the contents of the container. If the contents are hot, a person can be burned, or other damage can be done, by the liquid spilled. Of course, efforts have been made heretofore to make these containers out of various insulated materials, to provide handles on the container, and to provide removable tops on the containers, but all of such efforts have been unsuccessful, at least to some degree. Hence it is very difficult, if not impossible, to apply a top to a member such as a paperboard container, and to transport the contents of the container safely to a remote point for consumption. It will be realized that the containers used must be relatively inexpensive, and must be adapted to carry either hot or cold materials to remote point safely for consumption.

Heretofore there have been various efforts made to apply thermoplastic covers to various types of cups or containers. Insofar as I am aware, most of such previous types of apparatus or methods have required the use of relatively expensive heat seal means, or else they have required special heat seal gaskets for applying covers to cups or containers, or else they have been objectionable for other reasons, such as not functioning repeatedly and rapidly for complete sealing action.

The general object of the present invention is to provide a novel and improved method of and apparatus for applying thin thermoplastic films as covers for thermoplastic containers, such as cups, and characterized by the rapid, but tight bonding of a thin, relatively stiff thermoplastic film directly to the top edge or lip of a thermoplastic cup by a heat seal bonding action obtained therebetween.

Another object of the invention is to provide a rapid, positive acting, relatively inexpensive machine that can be repeatedly used for tightly attaching or bonding thin thermoplastic covers to thermoplastic containers to tightly and completely seal the contents, whether hot or cold liquids or other materials, within the containers by a readily broken thermoplastic seal.

Another object of the invention is to intermittently advance a strip of thermoplastic material slightly wider than a cup to a position over a container after which the advanced film can be severed from a strip of film and be forced downwardly against the thermoplastic container by a heater member for effecting, rapidly, a bonding action between the thermoplastic film and the top lip of the container.

A further object of the invention is to provide an automatic method for intermittently advancing film and then, in timed relation to the film advance, for forcing the film down against a container to be bonded thereto by a heat seal action.

The foregoing and other objects and advantages of the invention will be made more apparent as the specification proceeds.

Attention now is particularly directed to the accompanying drawings where:

FIG. 6 is a fragmentary, enlarged vertical section through the film guide and advance means and the cutter means of the apparatus, showing the film as it is being cut off and applied to a container;

FIG. 7 is a fragmentary horizontal section taken on line 7—7 of FIG. 6; and

FIG. 8 is a diagrammatic wiring circuit of the apparatus and controls therefor as shown in FIG. 3.

When referring to corresponding members shown in the drawings and discussed in the specification, corresponding numerals are used to facilitate comparison therebetween.

Figures 1, 2:
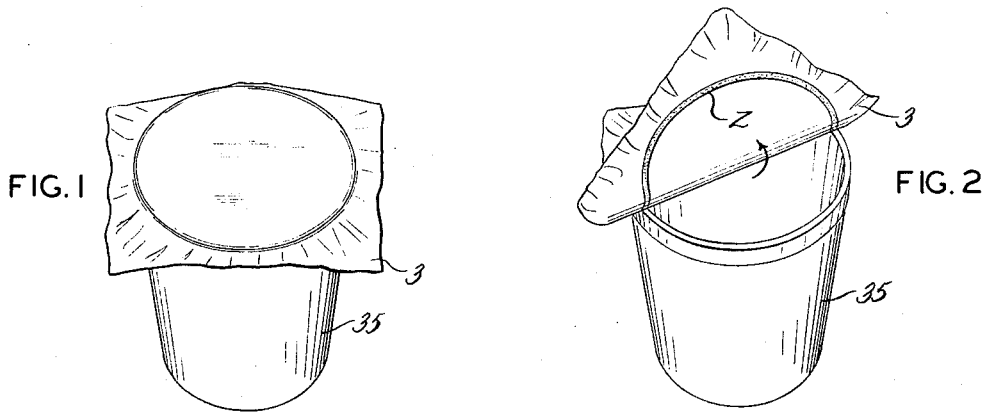
FIG. 1 is a perspective view of a container having a thermoplastic film bonded thereto in accordance with the principles of the invention.
FIG. 2 is a perspective view, like FIG. 1, but showing the action obtained when opening a sealed container as in FIG. 1.

While the present invention can be used in association with any suitable types of thermoplastic materials and containers, the invention is particularly suitable for use with thermoplastic cups which are made from polystyrene and thus possess appreciable heat insulating characteristics. Likewise, while any suitable heat seal plastic film can be used with the present invention, it particularly is adapted for use with an oriented polystyrene type of a film such as "Trycite" as made by the Dobeckmun Division of the Dow Chemical Company.

Such oriented polystyrene film is relatively stiff and, even in thin sheets thereof, such as about .001" or .002" in thickness, or less, it can be advanced by rolls, or other means engaging therewith and pushing the film forwardly. In many instances, thermoplastic films are not sufficiently stiff as to be advanced, and must be pulled or drawn forwardly, but such types of films cannot be used in the present invention, as will be explained hereinafter in more detail.

Generally speaking, the present invention relates to a heat seal apparatus and method for applying a thin thermoplastic film as a cover to a thermoplastic container, which apparatus comprises in one embodiment thereof means to engage and intermittently advance a strip of thermoplastic film which is slightly wider than the diameter of the thermoplastic container, guide means for engaging and supporting the film after it has been advanced by the first-named means, frame means adapted to receive and position a thermoplastic container under the advanced film, means associated with the first-named means to cut sections from the advanced film at desired intermittent periods in the travel thereof, and heater means positioned above the film at the cup positioning means for movement down against the film to force it against a positioned container whereby the heater means will contact the thermoplastic film and provide a continuous heat seal attachment of the film to the rim or other upper portion of the thermoplastic container for effectively sealing such container in a temporary manner.

With particular attention to the details of the structure shown in the drawings, the heat seal apparatus of the invention is indicated as a whole by the numeral 1. Such apparatus includes a suitable frame 2 that carries various components of the apparatus for use in applying a heat seal cover to a container. Preferably the apparatus journals a supply roll of thermoplastic film 3 thereon, as by a suitable support shaft 4 that is operably positioned on a portion of the frame 2. This film 3 preferably is an oriented polystyrene film, as previously discussed herein, and it is sufficiently stiff as to be urged in a forward direction by a pair of feed rolls, or the like. The film 4 also is appreciably wider than the thermoplastic container with which the film is to be operably associated. The film 3 is led from the supply roll over a pair of guide or festooning rolls 5 and 6 that are suitable operably positioned on the frame 2, and the roll 5 may have some vertical movement on the frame, if desired, to vary the length of the loop of film provided by the rolls 5 and 6.

The film 3 next passes to a controlled, driven feed roll 7 that may have a ring of a high friction material, such as rubber or a similar material 8 applied to the periphery thereof for driving engagement with the film 3, as hereinafter more fully described. The feed roll 7 is carried by a shaft 9 that is the output shaft of a film advance motor 10 received within a suitable housing, or cover 11. Such motor 10 is connected to a control or timer 12 provided therefor, being connected thereto by a pair of leads 13 and 14 whereby the motor 10 will be given an intermittent drive, as determined by the timer, and which drive of the motor 10 is of a controlled length whereby a predetermined amount of the film 3 will be advanced by the feed roll 7. The motor 10 is of the type that has a conventional magnetic brake (not shown) attached thereto or associated therewith whereby the motor 10 will not overrun and will give a fixed length of a drive for each actuation thereof, with such amount of drive normally being constant for the apparatus for any given style, or size of a container.

To insure positive feed of the film 3 with rotation of the feed roll 7, a pressure roller 15 is resiliently engaged with the upper surface of the film 3 at the feed roll 7. Such pressure roll 15 is shown journalled on a shaft 16 that in turn is carried by a support arm 17. The support arm 17 is itself pivotally carried by a lever arm 18. A coil spring 19, or similar member, extends between the support arm 17 and the lever arm 18 to urge the support arm 17 and the pressure roll 15 thereof continually towards the periphery of the feed roll 7. Thus the film 3 will be pressed into positive engagement with the periphery of the feed roll 7 to move therewith with drive of the motor 10. The film 3 passes through a pair of cutter, or guide plates 20 and 21 that are positioned in parallel but slightly vertical spaced relationship adjacent the discharge side of the roll 7. FIG. 6 of the drawings best shows that the lower cutter plate 20 extends forwardly in the direction of feed of the plastic film 3 slightly more than the upper cutter plate 21, and that a downwardly and backwardly beveled cutting edge 22 is formed on this lower cutter plate 20 to provide a shearing surface for cutting the film 3, as hereinafter described in more detail.

Figure 4:
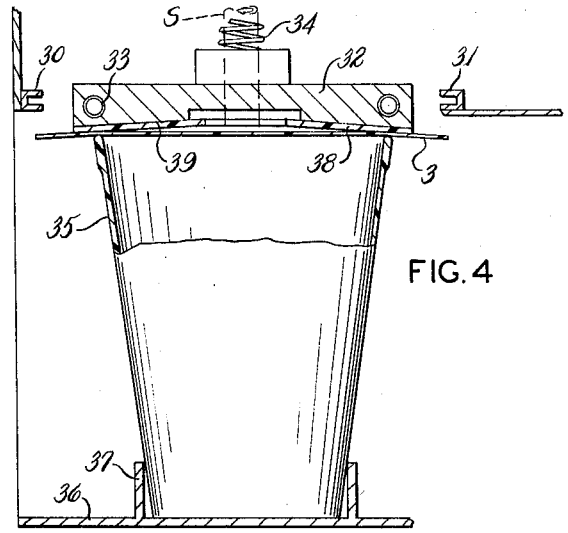
FIG. 4 is an enlarged fragmentary vertical section taken through the heater means, the associated film guide means, and the cup to be sealed in the apparatus of FIG. 3.
Figure 5:
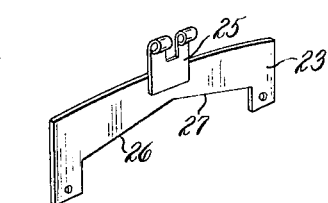
FIG. 5 is a perspective view of the cutter bar of the apparatus of FIG. 3.

The actual cutting action of the film 3 is effected by a cutter bar 23 that is secured to the lever arm 18 at a portion thereof downstream from the support arm 17. The cutter bar 23 is secured to the lever arm 18 by means of a positioning pin 24 that engages bifurcated upper portions of a support plate 25 attached to the cutter bar 23 and protruding upwardly therefrom. The cutter bar 23 has upwardly converging cutter surfaces 26 and 27 provided thereon. The positioning pin 24 usually engages a vertically extending lost motion slot 28 in the lever arm 18 to permit a small amount of lost motion between the lever arm and cutter bar. Preferably the cutter bar 23 is pulled against the cutter edge 22 of the cutter plate 20 at all times by means, such as a pair of coil springs 29, that engage the lower ends of the cutter bar 23 and are anchored to an adjacent portion of the apparatus 1, such as being secured to the enclosure 11 for the motor 10. The action of the cutter bar 23 hence is controlled by vertical movement of the lever arm 18 through means to be described hereinafter in more detail. In all events, when the cutter bar 23 is raised to its upper position, at that time the plastic film 3 is free to be fed between the cutter plates 20 and 21 and engage a pair of guide plates 30 and 31 secured to the frame and positioned at the lateral margins of the film. These guide plates 30 and 31, as shown in FIGS. 4 and 6, are laterally open channels and normally engage the lateral margins of the relatively stiff film 3, when advanced by the feed roll 7 and pressure roll 15, to position the film therebetween.

Figure 3:
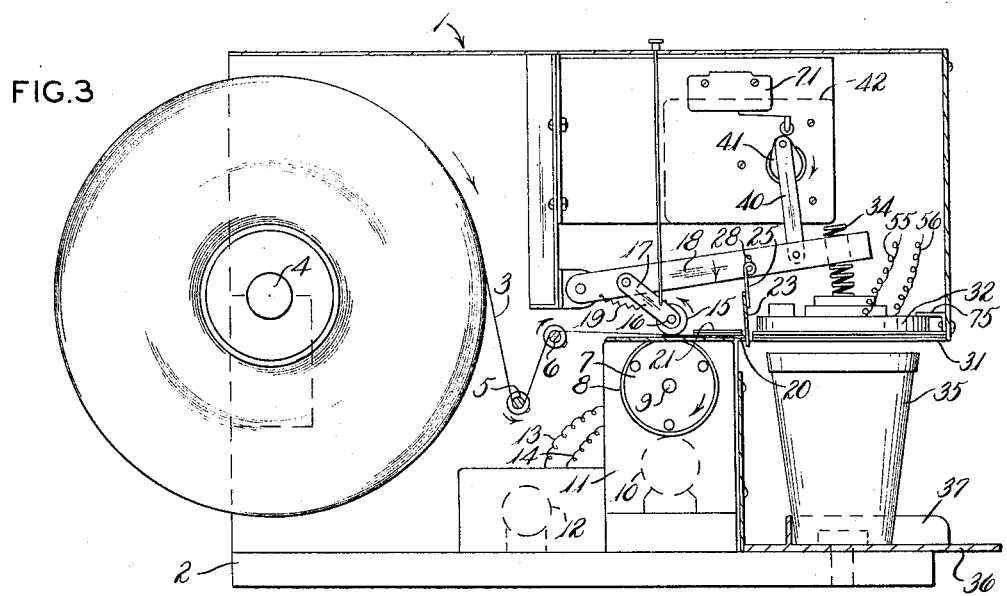
FIG. 3 is a vertical section taken through a heat seal apparatus embodying the principles of the invention.

The lever arm 18 also positions a heater means, such as a metal disc 32, that has an electric heater coil 33 provided therein. This lever arm 18 preferably carries the heater disc 32 by a member permitting universal movement and vertical adjustment therebetween and a coil spring 34 is provided for securing the heater disc 32 to the lever arm, whereby the heater disc can make some adjustment of position with relation to the horizontal or to the lever arm, as required, in order to come into full contact engagement with means, such as the upper rim of a thermoplastic container, in this instance a cup 35. The cup 35 is made from any suitable thermoplastic material, and preferably is of an insulating construction, such as being made from polystyrene beads. The cup 35 is suitably positioned on the frame 2 by being seated on a ledge 36 secured on the frame and being positively located on the ledge 36 by means of U-shaped guide flange 37 or the like. The cup is positioned at the base of this guide 37 for positive location in the apparatus. The heater disc 32 preferably has a heat resistant lower surface provided thereon, and in this instance, a layer or ring 38 of a suitable plastic material, such as Teflon, is secured to the lower face of the heater disc 32 to provide a material and a surface on the heater disc that does not bond to the film 3 even though transmitting heat thereto. Another feature of the invention is that the lower surface of the disc 32 is of a flat conical shape, as indicated at 39, and the plastic disc 38 is of uniform thickness throughout whereby a slightly upwardly converging surface is provided on the heater means to facilitate getting good continuous contact between the heater disc and the upper edge or lip of the cup 35. This also spaces the heater unit in the disc 32 slightly from the film 3 to avoid transmitting heat to undesired portions thereof. Downward movement of the heater disc 32 acts to force the section of the plastic film 3 cut from the strip of film and being engaged with the guides 30 and 31 downwardly to spring or push such section of the plastic film out of the guides 30 and 31 into engagement with the top of the cup 35, all as shown in FIG. 4, by movement of the heater disc from the elevated position shown in FIG. 3 to the depressed position shown in FIG. 4.

The movement of the lever arm and sealing action of the heater disc 32 is controlled by an arm or link 40 that pivotally connects to the lever arm 18 adjacent the free end thereof, and which also pivotally connects to a crank 41 secured to the output shaft of an electric motor 42. Such electric motor 42 is suitably secured to the frame 2 and is driven intermittently by conventional control means. Thus when a section of the plastic film 3 has been advanced, and is ready to be cut from the remainder of the plastic supply film or roll, at that time, the action of the motor 42 is such, through the arm 40, that it will cause the lever arm 18 to be forced downwardly and move the cutter bar 23 down to sever a section of the film from the plastic strip. The lever arm also brings the heater disc 32 into engagement with the film and ultimately forces the cut film against the upper edge of the container or cup 35 for a sufficient length of time as to provide the desired continuous heat seal action between an annular portion of the severed section of plastic film and the upper surface, or lip of the cup 35. The lever arm 18 is pivotally secured to a portion of the frame 2 by suitable means, and a bracket 43 is shown secured to a part of the frame 2 for positioning the lever arm 18 in the apparatus. It will be realized that the guides 30 and 31 will be positioned quite closely adjacent and immediately above and centered with relation to the container positioned in the apparatus of the invention by engaging the guide flange 37. Thus the severed section of plastic film does not become misaligned or out of position with relation to the container 35. The spring 34 aids in providing a resilient pressure contact between the heater member or disc 32 and the container for a sufficient length of time to obtain the desired seal action.

With reference to the diagrammatic wiring diagram of the control circuit for the heat seal apparatus 1 of the invention, FIG. 8 shows that power supply leads 50 and 51 are provided and that a power control on-off switch 52 is connected in the lead 50. Connector blocks 53 and 54 are provided and the power supply leads 50 and 51 connect to them, respectively, so that current will continually flow to the heater coil 33 by leads 55 and 56, as long as the switch 52 is closed. Actual control of the heat seal apparatus 1 is provided through the timer motor 12 that controls a certain conventional switching unit, such as a drum switch 57, that includes a plurality of contacts or switches 58, 59 and 60 therein. The leads 13 and 14, connecting to the timer motor 12, also connect to the connector blocks 53 and 54, respectively, with a normally open control switch 62 being present in the lead 14 whereby the timer motor 12 is energized each time that the switch 62 is temporarily closed. Such energization starts the timer motor 12 in rotation, and the control switch or contact 58 then immediately closes through a lead 63 that connects to the connector block 54 and a lead 64 that extends from the switch 58 back to the timer motor 12 to maintain such timer motor energized for one complete revolution, after which time the contact 58 is broken automatically and the timer motor stops. During the rotation of the timer motor 12, the contact 59 closes a circuit through leads 65 and 66 connecting thereto and to the connector block 53 to supply power to the film advance motor 10. The motor 10 is connected to the opposite power supply connector block 54 by a lead 67 whereby the desired time of motor operation, controlled by the timer motor 12, is obtained to advance the film 3 a predetermined distance. A lead 68 supplies power from the connector block 53 to the contact 60 to supply power for a predetermined length of time to a lead 69 of the pressure supply or control motor 42 that is continually connected to the opposite power supply block 54 by a lead 70 whereby a predetermined length operation of this pressure cut-off motor is obtained. The motor 42 also can be energized, when the contact 60 is open, by a normally closed switch 71, which has been held in open position by the crank arm of the motor 42 when at its top, or shut-off position, is closed. The switch 71 will remain closed to energize the motor 42 until the crank arm 41 again reaches its uppermost position at which time it will open the switch 71 and cut off the motor 42 until the contact 60 again closes an energization circuit. Such switch 71 is connected to the power supply block 53 by a lead 72 and connects to the motor by a lead 73. The closing of a circuit through the contactor 60 is such as to only start operation of the motor 42 and the remainder of the cycle of operation of this motor is normally controlled through the switch 71. Hence, for each actuation of the temporarily closed switch 62, the heat seal apparatus 1 of the invention will automatically cycle to provide a heat seal action.

It should be realized that the present apparatus, method and/or invention is adapted to be used with any suitable combination of other known types of apparatus, such as apparatus for brewing coffee, hot chocolate, and the like, and where the apparatus would be adapted to position the container in the apparatus, such as on the ledge 36 in the apparatus 1 of the present invention, and to have a filling spout, such as indicated at S in FIG. 4 pass down through the heat seal apparatus of the invention for filling the cup or container positioned on the ledge. Then after the container has been filled with hot or cold liquids, as desired, the apparatus of the invention would function in timed relation to the remainder of the apparatus and advance a strip of the thermoplastic film, cut off a section of such advanced film, and force such film section down against the upper edge of the container, or cup for heat seal engagement therewith.

It also will be realized that the apparatus of the invention could be used in any type of a conveyor line, or other production type of container filling apparatus with the apparatus of the invention functioning in timed relationship to the advance of filled containers by the conveyor whereby a section of thermoplastic film would be advanced, cut and applied to the individual containers as they move along the filling conveyor.

While one particular type of a container has been referred to in the application, it should be realized that this apparatus and method can be used with any suitable thermoplastic containers, and can even be used with some satisfaction in conjunction with paper or cardboard receptacles that have been impregnated with or given a surface coating on the upper edge or lip portion thereof of suitable thermoplastic materials whereby a bonding action can be obtained between the thermoplastic film and such plastic coated portion of the container.

A thermostat 74 is present in the energization circuit of the heater coil 33 and is positioned in the heater block to control the maximum temperature thereof.

It should be realized that the present invention provides a temporary type of a sealed engagement between the thermoplastic film and the container used, and that in making such a thermoplastic joint, a small surface or edge portion of the container has been melted and fused, or suitably bonded to the thermoplastic film. Hence, when one wishes to tear off the thermoplastic film from the container, a portion of the container, as indicated at Z in FIG. 2, usually will be retained on the undersurface of the thermoplastic film.

FIG. 2 of the drawing also shows how convenient it is to grasp the exposed edge portions of the sheet applied to the top of the container and protruding from the margins thereof to tear or pull, quite easily, such plastic film from engagement with the container. At the same time, the apparatus and method of the invention have functioned very satisfactorily to provide, rapidly, an effective, continuous heat seal between a thermoplastic container and a thermoplastic film. Such film can be applied to the container when it is substantially filled with a hot or cold liquid and then any expansion or contraction of trapped air inside the container will be reflected by a bulging of the plastic film inwardly or outwardly of the container as the material within a container expands or contracts. At the same time, this thermoplastic bond or seal of the film is sufficiently strong that a plurality of these containers can be stacked on top of each other and be directly supported on the thermoplastic film for convenient transportation from one filling area to a remote point where the contents of the containers are to be consumed.

It should be noted that the heater disc 32 is of novel shape and is particularly adapted to provide a continuous, tight seal of a film to the upper lip of a container. Thus the surface 39 of the heater disc 32 converges towards its center at an angle, for example, of between about 7° to about 14° to the horizontal to insure good contact between an outer portion of the top edge of the container 35 and the heater disc or member. As the film 3 has usually been biaxially oriented in its production, it is desirable that such film be secured to the container before it is heated to such an extent as to endeavor to heat shrink by a plastic memory action. Hence the heater disc is in contact with the container the minimum time required to form a suitable heat seal. If entrapped air in the container later expands, the film is strong enough to contain such pressure.

Preferably the heater disc 32 has some insulating and nonstick, or heat resistant coating layer on the surface 39. Hence the layer of Teflon impregnated glass fibers 38 is provided and is secured to the surface 39 that is recessed at the center thereof to keep the heat source spaced from the film as much as possible. Such layer 39 is usually of uniform thickness. The heater disc is adapted for use with various sizes of containers by the construction illustrated. Such plastic layer will not burn and is a poor heat conductor to require contact with a member for effective heat transfer thereto.

The container 35 may have a thermoplastic liner sheet secured thereto, at least at the rim thereof for heat seal action.

The heater disc 32 and the spring positioning means therefor, if desired, can be positioned in manually operated apparatus. Pre-cut sheets, or a strip of plastic film, as in the apparatus shown, could be used with this heater disc which could be manually controlled to be engaged with a thermoplastic film and a container for several seconds to obtain a heat seal therebetween.

A pressure of up to several pounds per square inch is usually applied for heat seal action.

It will be realized that the lever arm 18 moves the cutter bar 23 up out of the path of the plastic film 3 when the film is being advanced. Such cutter bar preferably is of slightly concave shape in horizontal section to aid in obtaining a scissors-type cutting action as the cutter bar 23 is moved downwardly. The shape of such cutter bar is indicated by the dotted line X in FIG. 7. The cutter plate 20 has any conventional cutting edge formed thereon.

Usually the heater member or disc 32 is positioned substantially horizontal when inoperative. Hence, a bracket 75 can be secured to the frame 2 above the guides 30 and 31 to engage an edge of the heater disc to position it horizontally above the guides with minimum movement of the lever arm 18.

While one complete embodiment of the invention has been disclosed herein, it will be appreciated that modification of this particular embodiment of the invention may be resorted to without departing from the scope of the invention as defined in the appended claims.

What is claimed is:

1. In heat seal apparatus for applying covers to thermoplastic cups, the combination of means to engage and intermittently advance a strip of thermoplastic film slightly wider than the diameter of a cup, which means include a drive roll and a pressure roll and a support arm therefor, the film being engaged between said drive roll and pressure roll, a lever arm to which said support arm is pivotally attached, guide means to engage and support said film as advanced by said means, frame means to position a cup under said advanced film, a pair of parallel horizontal vertically spaced guide plates extending transversely of said film and having said film pass therebetween, cutter means including a cutter bar attached to said lever arm and associated with said guide plates to cut said film into sections after it has been advanced, heater means positioned above said film on said lever arm at said cup positioning means, and timer and driven cam means engaging said lever arm to force it towards a positioned cup to cut said film and force such film against said cup by said heater means for heat seal contact between said film and said cup.

2. In heat seal apparatus for applying covers to thermoplastic containers having an upwardly open flat top surface, the combination of means to engage and intermittently advance a strip of thermoplastic film slightly wider than the container, which means include a pressure roll and a support arm therefor, a lever arm to which said support arm is attached, guide means to engage and support said film at it lateral margins as advanced by said means, means to receive and position a container under said advanced film, cutter means including a cutter bar attached to said lever arm and associated with said first-named means to cut said advanced film into sections, heater means positioned on said lever arm above said film at said container positioning means, said heater means being positioned for universal movement with reference to said lever arm, and driven cam means engaging said lever arm to force it towards a positioned container to cut a section from said film and then to force it into heat sealed contact with said top surface of said container.

3. In heat seal apparatus for applying covers to thermoplastic cups, or other upwardly open containers, the combination of means to engage and intermittently advance a strip of thermoplastic film slightly wider than the diameter of a cup, guide means to engage and to support said film as advanced by said means, said guide means defining a cutting edge, means to receive and accurately position a cup under said advanced film, means associated with said guide means having at least a portion thereof in continuous contact with the cutting edge of the guide means and being pivotal to cut said film into sections, and a metal electrically heated heater means movably positioned above said film at said cup positioning means to be moved down against said film and force it out of said guide means and against a positioned cup for heat seal attachment to the rim thereof, said heater means having a flatly conical upwardly converging lower surface.

4. In heat seal apparatus for applying covers to thermoplastic containers, the combination of means to engage and intermittently advance a continuous uniform strip of thermoplastic film slightly wider than the container, guide means to engage and support said film as advanced by said means, means to position a container under said advanced film, means associated with said first-named means to cut a substantially square section from the advanced portion of said film, and heater means movably positioned above said film at said container adapted for movement down against said film to force it against said container for heat seal attachment of a continuous portion of said film to the rim thereof, said heater means having a resilient centrally positioning mounting whereby it is tiltable in any direction to allow adjustable fitting to the rim variations of any container.

5. In heat seal apparatus for applying covers to thermoplastic cups, or other containers, the combination of driven means to engage and intermittently advance a strip of thermoplastic film slightly wider than the diameter of a cup, guide means to engage and support said film as advanced by said means, said guide means defining a cutting edge, means to receive and position a cup under said advanced film, means operably associated with said guide means to cut said film into sections after it has been advanced a predetermined distance to control the length of the severed strip, said means having limited vertical movement and with at least a portion thereof always being in contact with the cutting edge of the guide means to define a sissors type cutting action, and heater means positioned above said film at said cup positioning means for movement down against said film to force it against a positioned cup for heat seal attachment to the rim thereof.

6. Apparatus for applying covers from a roll of thermoplastic film to thermoplastic containers comprising a frame adapted to journal a roll of thermoplastic film, a feed roll, timed drive means operatively connecting to said feed roll, a pressure roll in operative engagement with said feed roll, said film being led between said feed and pressure rolls, a pair of horizontally positioned, spaced, parallel cutter plates between which said film passes as advanced by said rolls, a cutter bar operably positioned adjacent said cutter plates for substantially vertical movement with relation thereto to cut a section from said film.

a pair of opposed horizontal guide members to receive and guide said film as advanced past said cutter plates, said frame having a container receiving seat formed thereon below said guide members, a disc-like heater means positioned above said guide members, and means engaging said cutter bar and heater means to move them vertically downwardly to cut a section from said film and to press such section down against a container on said seat for heat seal engagement with the top thereof.

7. Apparatus for applying covers to thermoplastic containers comprising a frame, means for supplying a strip of relatively stiff thermoplastic film, a feed roll, controlled drive means operatively connecting to said feed roll, a pressure means in operative engagement with said feed roll, said film being led between said feed roll and pressure means to be advanced with relation thereto, a pair of spaced, parallel cutter plates between which said film passes as advanced by said feed roll, a cutter bar operably positioned adjacent said cutter plates for intermittent movement with relation thereto to cut the advanced section from said film, a pair of opposed guide members to receive and guide said film as advanced past said cutter plates by said feed roll, said frame having a container receiving seat formed thereon below said guide members, a heater means positioned above said guide members, and means engaging said cutter bar and heater means to move them to cut the advanced section from said film and to press such section down against a container on said seat for heat seal engagement with the top thereof.

8. In heat seal apparatus for applying covers to thermoplastic containers, the combination of a frame, means to engage and intermittently advance a strip of thermoplastic film slightly wider than the container, guide means on said frame to engage and support said film as advanced by said means, means to position a container on said frame under said advanced film, means associated with said first-named means to cut a section from the advanced portion of said film, a member pivotally carried by said frame above and adjacent said container, and heater means resiliently centrally mounted and movably positioned above said film by said member at said container whereby the heat means is tiltable to the plane of the lip of the container and adapted for movement down against said film to force it against the lip of said container for heat seal attachment of a continuous portion of said film to the rim thereof, said heater means including a metal member having an upwardly converging conical lower surface at an acute angle to the horizontal, and an insulating and non-stick surface means carried by said metal member on the lower surface thereof.

9. In heat seal apparatus for applying thermoplastic film covers to containers having thermoplastic material on the tops of the rims thereof, the combination of a frame, means to position a container on said frame, guide means on said frame to engage and support a section of said film above said container by engaging opposed lateral margins of said film section, a member movably carried by said frame above said guide means and adjacent said container, and heater means resiliently mounted at the center thereof and operably carried by said member for movement down against a center portion of said film to force it against said container for heat seal attachment of a continuous portion of said film to the rim thereof said heater means including a metal member having an upwardly converging conical lower surface at an acute angle to the horizontal, and an insulating and non-stick surface means carried by said metal member on the lower surface thereof.

10. In heat seal apparatus for applying thin thermoplastic film sections as covers to containers having thermoplastic material on the tops of the rims thereof, the combination of a frame, means to position a container on a section of said frame, a member pivotally mounted to said frame above said section thereof, a helical coiled spring mounted at one end to the member, and heater means mounted at the center thereof to the other end of the spring and positioned for movement down against any said film section on the rim of a container on said frame section to force it against said container for heat seal attachment of a continuous portion of said film to an outer portion of the rim thereof, said heater means including a metal member having an upwardly converging conical lower surface which is at an acute angle to the horizontal, and an insulating heat resistant uniformly thick surface means carried by said member on said lower surface thereof.

11. In heat seal apparatus for applying thin thermoplastic film sections as covers to containers having thermoplastic material on the tops of the rims thereof, the combination of a frame, means to position a container on a section of said frame, a member movably carried by said frame above said section thereof, and a temperature controlled electric heater means positioned by said member for movement down against any said film section on the rim of a container on said frame section to force it against said container for heat seal attachment of a continuous portion of said film to an outer portion of the rim thereof, said heater means including a metal member having an upwardly converging conical lower surface which is at an acute angle of between about 7° to about 14° to the horizontal.

References Cited by the Examiner

UNITED STATES PATENTS

| | | | |
|---|---|---|---|
| 2,955,395 | 10/1960 | Aubry | 53—389 X |
| 3,112,587 | 12/1963 | Anderson et al. | 53—296 X |
| 3,137,111 | 6/1964 | Bostrom | 53—373 |

FRANK E. BAILEY, *Primary Examiner.*

TRAVIS S. McGEHEE, *Examiner.*

R. L. FARRIS, *Assistant Examiner.*